Feb. 23, 1926.
L. BONELL
PERCOLATOR
Filed Nov. 1, 1924
1,574,021
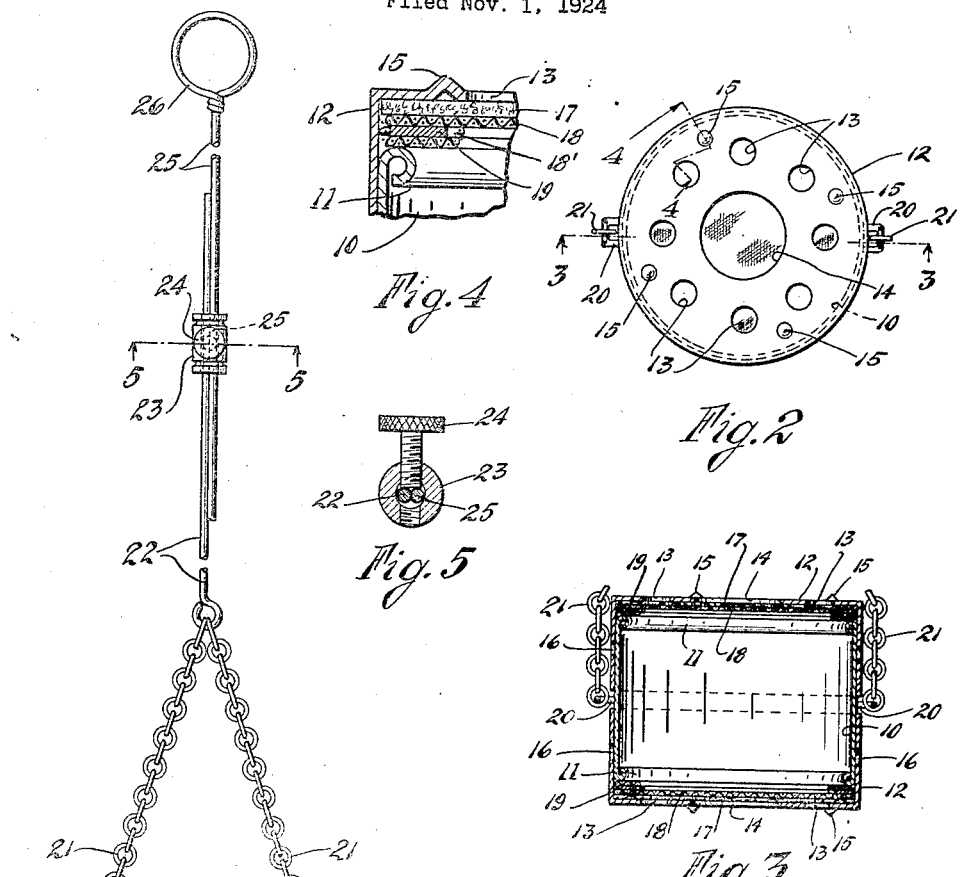
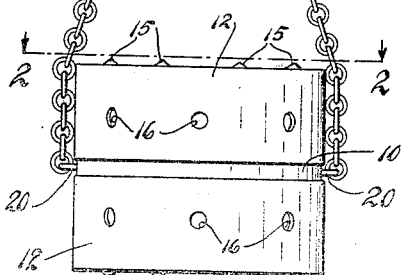

Patented Feb. 23, 1926.

1,574,021

UNITED STATES PATENT OFFICE.

LAWRENCE BONELL, OF CHICAGO, ILLINOIS.

PERCOLATOR.

Application filed November 1, 1924. Serial No. 747,150.

*To all whom it may concern:*

Be it known that I, LAWRENCE BONELL, a citizen of the United States, and a resident of the city of Chicago, county of Cook, and State of Illinois, have invented certain new and useful Improvements in Percolators, of which the following is a specification.

My invention relates to new and useful improvements in percolators, and more particularly to a coffee percolator and has for its object the provision of such a device which will positively prevent any grounds or solid particles from getting into the liquid coffee within the container or therefrom into the cup; and another object is to provide such a device which can be easily separated and thoroughly cleaned, and is therefore especially sanitary, and which has adjustable means for conveniently removing the device from the container.

Other objects will appear hereinafter.

The invention consists in the combinations and arrangements of parts hereinafter described and claimed.

The invention will be best understood by reference to the accompanying drawings forming a part of this specification, and in which, Fig. 1 is an elevational view of my invention;

Fig. 2 is a plan view, partly in section on line 2—2 of Fig. 1;

Fig. 3 is a vertical sectional view, taken on line 3—3 of Fig. 2;

Fig. 4 is an enlarged fragmentary view, taken on line 4—4 of Fig. 2;

Fig. 5 is an enlarged detail view, taken on line 5—5 of Fig. 1; and

Fig. 6 is a view of the reticulated member or screen.

The preferred form of construction as illustrated in the drawing comprises a casing 10, preferably tubular in form and having two open ends which are preferably provided with ledge means 11 as by curving or turning over said ends. Straining means is removably mounted over each of said ends and preferably includes a cover 12 with perforations 13 and a large central perforation 14 therein, said cover also contains several projections or indentations 15 extending outwardly so as to provide a space between the cover and the container upon which these projections rest in order to provide proper circulation through the openings or perforations 13 and 14; openings 16 are also provided in the side wall of said cover to aid in turning and removing the cover from the casing. Closely woven straining means 17 is mounted in the cover and is preferably made of closely woven cloth of three or more ply in thickness; and a substantially stiff and reticulated member 18 is placed over said cloth strainer to retain it in position, said member resting on ledge 11 and being preferably made of closely meshed wire screen with its perimeter bent over a ring or member 19 for re-inforcing said wire screen.

Means is provided for conveniently lifting this device from a coffee pot or container, and preferably includes a pair of ears 20 extending from the side of the casing, and chains 21 attached to said ears and to a bar or wire 22 which is embraced by a sleeve 23 containing a set screw 24 for adjustably clamping said bar 22 to an upper bar or member 25 which has an eye 26 at its upper end. This lifting means is thus made adjustable for length and provides convenient means for removing the device from the coffee container.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device of the class described comprising a casing to be inserted in and enclosed by a container, a reticulated metallic member mounted across an open end of said casing, a cloth strainer mounted outward of said member, and a perforated cover mounted over said member and strainer, said member and cover forming reinforcing means for said strainer, and said member and strainer and cover being readily removable and separable in order to be cleaned.

2. A percolator device insertable within a container and to rest on the bottom thereof, said device comprising a casing having open ends, straining means mounted over each end, a perforated cover mounted over each straining means and end, means on each cover to space its perforations from the bottom of the container, and handle means attached to said casing intermediate said covers for conveniently removing the devce from the container.

3. A percolator device comprising a casing with its opposite ends open and immersible within a coffee container, straining mechanism removably mounted over each end, and comprising a perforated cover fitting over the end, a closely woven cloth strainer within said cover and mounted across said perforations, and a reticulated metallic member mounted inward of said cloth strainer, said cover and metallic member reinforcing the cloth strainer.

4. A percolator device insertable within containers of various sizes and comprising a tubular casing with its opposite ends open, a straining mechanism removably mounted over an end and comprising a perforated cover fitting over the end, a closely woven strainer within said cover mounted across said perforations, and a wire screen with a reinforcing ring removably mounted over said strainer and engaging the open end of said casing.

5. A percolator device insertable within contaners of various sizes and comprising a casing with open ends, straining means mounted over each end and arranged to prevent any solid particles passing therethrough, a perforated cover mounted over each end to retain said straining means in position, and handle means with means for adjusting it for length to conveniently remove said device from a container.

6. A percolator device insertable within containers of various sizes and comprising a casing with open ends, straining means removably mounted over each end and arranged to prevent any solid particles passing therethrough, a perforated cover mounted over each end to retain said straining means in position, said cover having openings in its side to aid in readily removing the same, and means adjustable for length for conveniently removing the device from a coffee container.

7. A percolator device suitable for containers of various sizes and comprising a casing having open ends and arranged to be inserted entirely within the container, straining mechanism removably mounted over an open end and comprising a perforated cover removably fitting over said end, a closely woven fabric strainer member mounted inward of said cover, a wire screen member mounted inward of said strainer member and arranged to retain the same in position against the perforated cover, projections under said cover to space the same from the bottom of the container, and handle means on the casing including flexible means and rod means adjustable for length for conveniently removing the device from the container.

In testimony whereof I have signed my name to this specification.

LAWRENCE BONELL.